US009571989B2

(12) United States Patent
Schuberth

(10) Patent No.: US 9,571,989 B2
(45) Date of Patent: Feb. 14, 2017

(54) TRANSMISSION ARRANGEMENT PROVIDED WITH A MAIN TRANSMITTER AND AT LEAST ONE RECEIVER APPARATUS

(71) Applicant: INSTITUT FUR RUNDFUNKTECHNIK GMBH, Munich (DE)

(72) Inventor: Georg Schuberth, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 14/773,249

(22) PCT Filed: Mar. 5, 2014

(86) PCT No.: PCT/EP2014/054264
§ 371 (c)(1),
(2) Date: Sep. 4, 2015

(87) PCT Pub. No.: WO2014/135587
PCT Pub. Date: Sep. 12, 2014

(65) Prior Publication Data
US 2016/0014573 A1    Jan. 14, 2016

(30) Foreign Application Priority Data

Mar. 5, 2013 (IT) .............................. TO2013A0173

(51) Int. Cl.
*H04W 4/06* (2009.01)
*H04B 7/155* (2006.01)

(52) U.S. Cl.
CPC ............... *H04W 4/06* (2013.01); *H04B 7/155* (2013.01)

(58) Field of Classification Search
CPC .................................. H04W 4/06; H04B 7/155
(Continued)

(56) References Cited

U.S. PATENT DOCUMENTS

2014/0010143 A1* 1/2014 Barrett ................... H04B 7/15
                                                                  370/312

FOREIGN PATENT DOCUMENTS

EP    2 209 278 A1    7/2010
EP    2 403 297 A1    1/2012
(Continued)

OTHER PUBLICATIONS

International Search Report and Written Opinion dated Mar. 28, 2014, issued in PCT Application No. PCT/EP2014/054264, filed Mar. 5, 2014.
(Continued)

*Primary Examiner* — Cong Tran
(74) *Attorney, Agent, or Firm* — Workman Nydegger

(57) ABSTRACT

A transmission arrangement includes a main transmitter (100) for transmitting a first broadcast transmission signal in a reception area (104), and a receiver apparatus (106) adapted to receive the first broadcast transmission signal (102) and to transmit a second broadcast transmission signal (110) in response to the reception of the first broadcast transmission signal. The first broadcast transmission signal (102) includes subsequent first information packets ($IP_{MT}1$, $IP_{MT}2$, $IP_{MT}3$, . . . ) with subsequent first information packets ($IP_{MT}i$) having at least two subsequent information blocks ($IB_{MT}i.1$, $IB_{MT}i.2$) having substantially the same information. The second broadcast transmission signal includes subsequent second information packets ($IP_{RS}1$, $IP_{RS}2$, $IP_{RS}3$, . . . ) with subsequent second information packets ($IP_{RS}i$) having at least one information block ($IB_{RS}i$). The second information packets ($IP_{RS}i$) of the second broadcast transmission signal (110) are of substantially the same length in time as the first information packets ($IP_{MT}i$) of the first broadcast transmission signal and the information blocks ($IB_{RS}i$) of the second information pack-
(Continued)

ets are of substantially the same length in time as the information blocks ($IB_{MT}$ i,j) of the first information packets. The receiver apparatus (106) is further adapted to transmit the second broadcast transmission signal such in time, that the formation blocks ($IB_{MT}$i.2, $IB_{MT}$ i+1.2, . . . ) in the first information packets in the first broadcast transmission signal are correlated in time with the at least first information blocks ($IB_{RS}$ i, $IB_{RS}$ i+1, . . . ) in the second information packets in the second broadcast transmission signal. This results in an increase of the reception area of the main transmitter by the reception area of the receiver apparatus.

22 Claims, 10 Drawing Sheets

(58) Field of Classification Search
USPC ........ 455/422.1, 73, 78, 103, 443, 445, 500; 370/312, 313; 375/219, 220, 267, 297
See application file for complete search history.

(56) References Cited

FOREIGN PATENT DOCUMENTS

| TW | 201210395 | 3/2012 |
| WO | 2009/067930 A1 | 6/2009 |
| WO | 2012/126828 A1 | 9/2012 |

OTHER PUBLICATIONS

Written Opinion of the International Preliminary Examining Authority dated Feb. 20, 2015, issued in in PCT Application No. PCT/EP2014/054264, filed Mar. 5, 2014.

International Preliminary Report on Patentability dated Jun. 12, 2015, issued in PCT Application No. PCT/EP2014/054264, filed Mar. 5, 2014.

* cited by examiner

TRANSMISSION ARRANGEMENT PROVIDED WITH A MAIN TRANSMITTER AND AT LEAST ONE RECEIVER APPARATUS

FIELD OF THE INVENTION

The invention refers to a transmission arrangement in accordance with the preamble of the main claim. The invention also refers to a main transmitter and a receiver apparatus in the transmission arrangement.

A transmission arrangement in accordance with the preamble of the main Claim is known from EP-2209278A1. This known transmission arrangement comprises one or more main transmitters and these form a Single Frequency Network (SFN).

BACKGROUND OF THE INVENTION

The media users often desire additional information on a currently running event, such as an international football match. This can be obtained e.g., via the Internet (P2P). If a large number of users call up the same content (in the same place) at the same time, a broadcast transmission is more economical.

If the spatial distribution (for wireless provision) can no longer be undertaken using a base station (a main transmitter), the radio broadcasting often utilizes SFN (single frequency network) in its networks, as also described in the above-mentioned patent application.

BRIEF DESCRIPTION OF THE INVENTION

The object of the invention is to propose an improved transmission arrangement.

The transmission arrangement in accordance with the preamble of the main claim is additionally characterised in accordance with the characterising part of the main claim. Advantageous embodiments of the transmission arrangement are characterised in the dependent Claims 2 to 7. The main transmitter of the transmission arrangement is characterised in accordance with claims 8 to 13. The receiver apparatus in the transmission arrangement is characterised in accordance with one of the claims 14 to 20.

All the attached claims are considered as an integral part of the present description.

The following inventive concept forms the basis of the invention.

The extension of a wireless provision (such as in an LTE broadcast mode), as already indicated above, can be achieved by connecting further base stations (main transmitters) in the SFN mode. These base stations must have the same data available and must transmit this data chronologically synchronously. Generally, the base stations are fed via a cable connection. These base stations (main transmitters), then, should be viewed as fixed. In order to be able to change the reception area more flexibly, the installation of terminals (receiving units) in accordance with the invention is proposed. The main transmitter sends out information packets, each consisting of at least two (almost) identical information blocks, as a broadcast transmission signal. The main transmitter can attach a label ('flag') to the first of the information blocks in an information packet, which identifies this information block as the first in the information packet.

The flag can also be dispensed with if the receiver is somewhat more intelligent: the consecutive packets in a synchronisation phase could be compared and it could thus learn at what points in time a first information block of a first information packet will then arrive.

The receiver apparatus (terminal) receives the first information block of a first information packet in the first broadcast transmission signal and saves this in a transmission memory. (The block received can be saved in the receiver apparatus in parallel to this and processed as normal.) The receiver apparatus is able to re-send this information block as a second transmission signal. This transmission of the information block takes place after a set interval, according to the time offset between the transmission of the first and the second block in the main transmitter. The second information block transmitted by the main transmitter and the information block transmitted by the receiver apparatus (terminal) with similar content therefore overlap.

This means that the range of the main transmitter can be increased by the range of the receiver apparatus (terminal).

It should be noted that WO2012/126828 and WO 2009/067930 disclose measures to establish a Single Frequency Network, being built up of a base station and one or more stationary relay stations. In WO2012/126828, this is realized by first transmitting a block of information to the one or more relay stations via a unicast channel, and thereafter transmitting the same block of information to a mobile user terminal both by the base station and the one or more relay stations via a broadcast transmission channel. Main topic in the publication is however, establishing the right timing between the base station and the one or more stationary relay stations that should be known to the base station, so as to establish the SFN. The known transmitter however, does not transmit a first broadcast transmission signal in the form of subsequent first information packets, the subsequent first information packets comprising at least two subsequent information blocks comprising substantially the same information, where the broadcast transmission range can be extended by mobile receivers.

BRIEF DESCRIPTION OF THE FIGURES

The invention is described in detail with reference to several embodiments in the following figure description. Therein.

DETAILED DESCRIPTION OF THE PREFERRED EMBODIMENTS

Figure 1:
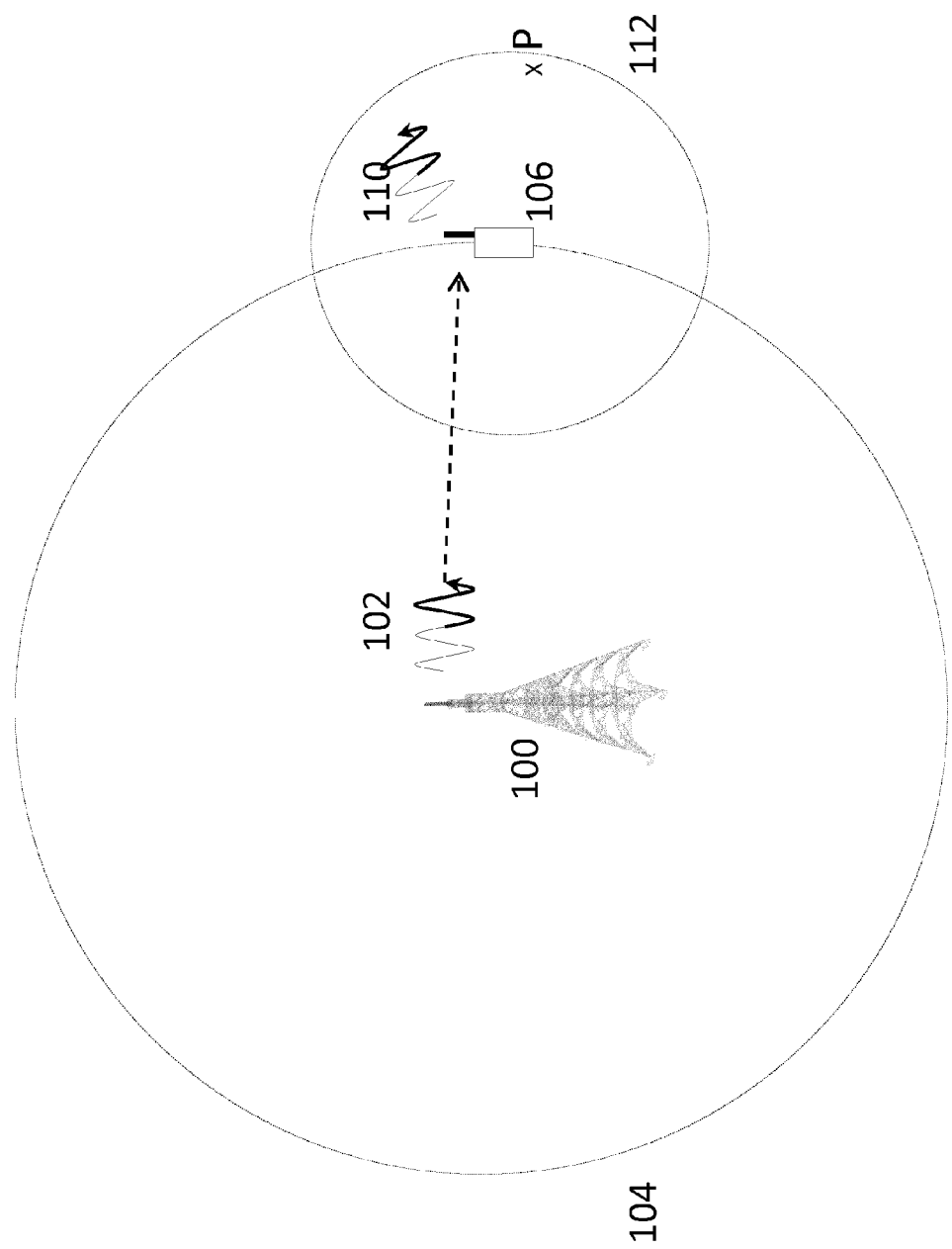
FIG. 1 shows a first embodiment of the transmission arrangement, FIG. 2 schematically shows an embodiment of the first and second transmission signals of the main transmitter and of the receiver apparatus, FIG. 3 schematically shows a second embodiment of an information packet of the first transmission signal.
Figure 2:
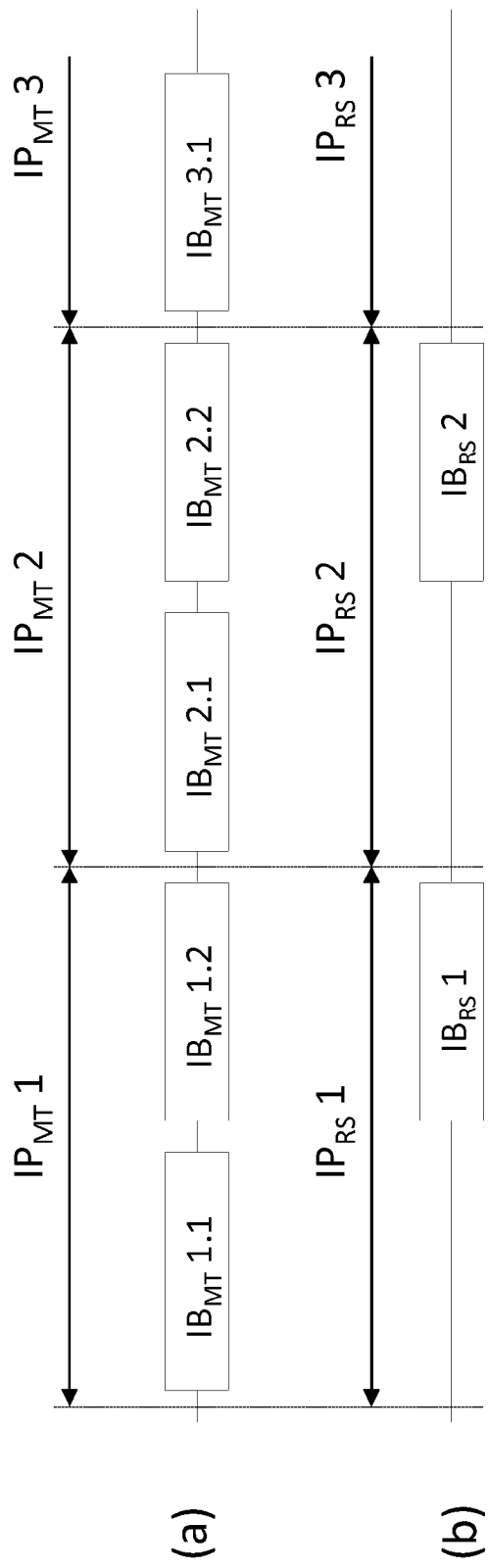

FIG. 1 shows an embodiment of a transmission arrangement in accordance with the invention, for transmission a first transmission signal. The transmission arrangement is provided with a main transmitter 100, which transmits the first broadcast transmission signal 102 over a reception area 104. The first broadcast transmission signal 102 is a series of information packets ($IP_{MT}1$, $IP_{MT}2$, $IP_{MT}3$, . . . ), which contain at least two information blocks. As shown in FIG. 2a, the information packets, such as $IP_{MT}2$, contain two consecutive information blocks $IB_{MT}2.1$ and $IB_{MT}2.2$. The (at least) two information blocks of an information packet contain essentially the same information. The abbreviation MT stands for 'Main Transmitter'.

The transmission arrangement in accordance with the invention is, in addition, provided with at least one receiver apparatus ('terminal'). Only one receiver apparatus 106 is shown in FIG. 1. The receiver apparatus 106 is installed for receiving the first broadcast transmission signal 102 and is also capable of transmitting a second broadcast transmission signal 110 over a reception area 112, in response to receiving the first transmission signal. The receiver apparatus thus works as a 'relay station' for the first transmission signal, as further described below. The receiver apparatus 106 can be a mobile receiver apparatus, preferably in the form of a mobile phone.

An embodiment of the second broadcast transmission signal is shown in FIG. 2b. The second broadcast transmission signal 110 is formed by information packets $IP_{RS}1$, $IP_{RS}2$, $IP_{RS}3$, . . . , which contain at least one information block. As shown in FIG. 2b, the information packets $IP_{RS}i$ contain only one information block $IB_{RS}i$. The abbreviation RS stands for 'Relay Station'.

The information packets $IP_{RS}i$ of the second broadcast transmission signal 110 are generally of the same length as the information packets $IP_{MT}i$ of the first broadcast transmission signal 102.

The information blocks $IB_{RS}i$ of the information packets $IP_{RS}i$ are generally of the same length as the information blocks $IB_{MT}i.1$ and $IB_{MT}i.2$ of the first transmission signal. The information block $IB_{RS}i$ generally contains the same information as the information blocks $IB_{MT}i.1$ and $IB_{MT}i.2$.

In addition, the receiver apparatus 106 is equipped for transmitting the second broadcast transmission signal 110 in the time in such a way that the second information blocks $IB_{MT}i.2$ of the first information packets $IP_{MT}i$ in the first broadcast transmission signal 102, as they arrive at the receiver apparatus, are at least approximately simultaneous with the information blocks $IB_{RS}i$ of the second information packets $IP_{RS}i$ in the second broadcast transmission signal 110, as it is sent by the receiver apparatus. This can be seen in FIG. 2.

In addition, the receiver apparatus 106 is equipped for transmitting the second broadcast transmission signal 110 in the time in such a way and with such a phase that the simultaneous information blocks $IB_{RS}i$ of the second information packets in the second broadcast transmission signal and the second information blocks $IB_{MT}i.2$ of the first information packets in the first broadcast transmission signal 102 overlap constructively in a position P in the reception area 112 of the receiver apparatus 106. Here, the position P can be located both within the current coverage area (e.g., improvement of the reception in a position shadowed from the main transmitter) and outside the coverage area of the main transmitter; see also, on the other hand, FIG. 1. This will be explained in more detail later on with reference to FIG. 5.

Figure 3:
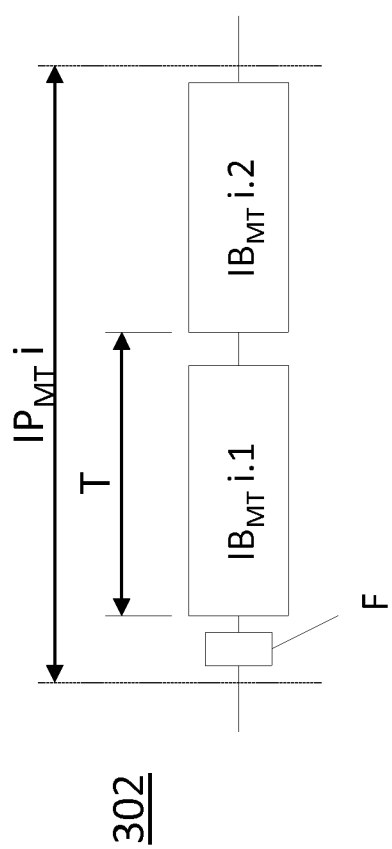

Another embodiment of the first broadcast transmission signal 102 is shown in FIG. 3, and is indicated there by the reference number 302. In this embodiment, a flag F1 is allocated to the first information block $IB_{MT}i.1$ in a first information packet $IP_{MT}i$, which identifies it as the first information block in the information packet $IP_{MT}i$. This flag is used in the receiver apparatus to detect the first information block in the information packets. This will be explained in more detail with reference to the embodiment of the receiver apparatus 406, as shown in FIG. 4.

Figure 4:
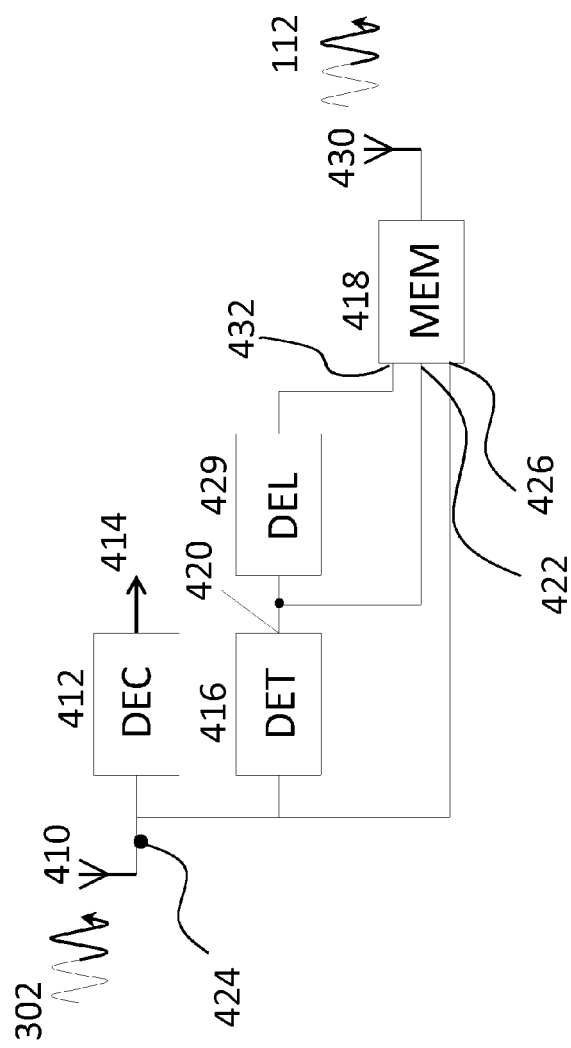
FIG. 4 shows an embodiment of a receiver apparatus of the invention, FIG. 5 schematically shows the overlapping of the two transmission signals.

FIG. 4 shows a first antenna device 410 for receiving the first broadcast transmission signal 302. The antenna device 410 does not need to be part of the receiver apparatus according to the invention because the arrangements according to the invention are not located in the antenna device 410. A decoder unit 412 is included to decode the information contents in the first information packets $IP_{MT}i$ received. The decoded output signal is prepared at the output 414 of the receiver apparatus.

The receiver apparatus also contains a detection unit 416 and an transmission memory 418. The detection unit 416 recognizes the first information block $IB_{MT}i.1$ in an information packet $IP_{MT}i$ and generates a control signal in response to the detection of a first information block $IB_{MT}i.1$ in an information packet $IP_{MT}i$. This detection can be realized e.g., by comparing the contents of two consecutive information blocks of the first broadcast transmission signal with one another. The control signal is generated when a similarity is detected. This potential detection is executed if there are no flags present in the transmission signal. The detection can also be realised by detecting the flags in the first transmission signal, in response to which control signals are generated. These control signals are provided at the output 420 of the detection unit 416 and are fed to a control input 422 of the memory 418.

For this purpose, the output terminal 424 of the first antenna device 410 is also coupled to the input of the detection unit 416 and the input terminal 426 of the memory 418. In response to a control signal, a first information block $IB_{MT}i.1$ of the information packet $IP_{MT}i$ is saved in the memory 418. The control signal from the detection unit 416 is also fed to a delay unit 428 and is delayed here by a time interval T. The time T is given in FIG. 3 and corresponds to the time interval between the two information blocks in an information packet. In response to the control signal delayed by T, which is provided by the delay line 428 at the control input terminal 432 of the memory 418, this memory 418 emits its contents (after amplifying the signal, if necessary) to the transmitting antenna 430 and hence an information packet $IB_{RS}i$ of the second broadcast transmission signal 112 is transmitted by the antenna 430. It is also the case here that the transmitting antenna 430 does not need to be part of the receiver in accordance with the invention because the arrangements according to the invention are not located in the transmitting antenna.

It should also be noted here that when the receiver apparatus in FIG. 4 is located in a position P (see FIG. 1), that is, outside the reception area 104 of the main transmitter 100, and the receiver apparatus receives a transmission signal as shown in FIG. 5d, it detects that only one information block is contained in an information packet. When this situation is detected by the receiver apparatus, this information block is no longer saved in the transmission memory 418, but is only decoded in the decoder unit 412.

Figure 5:
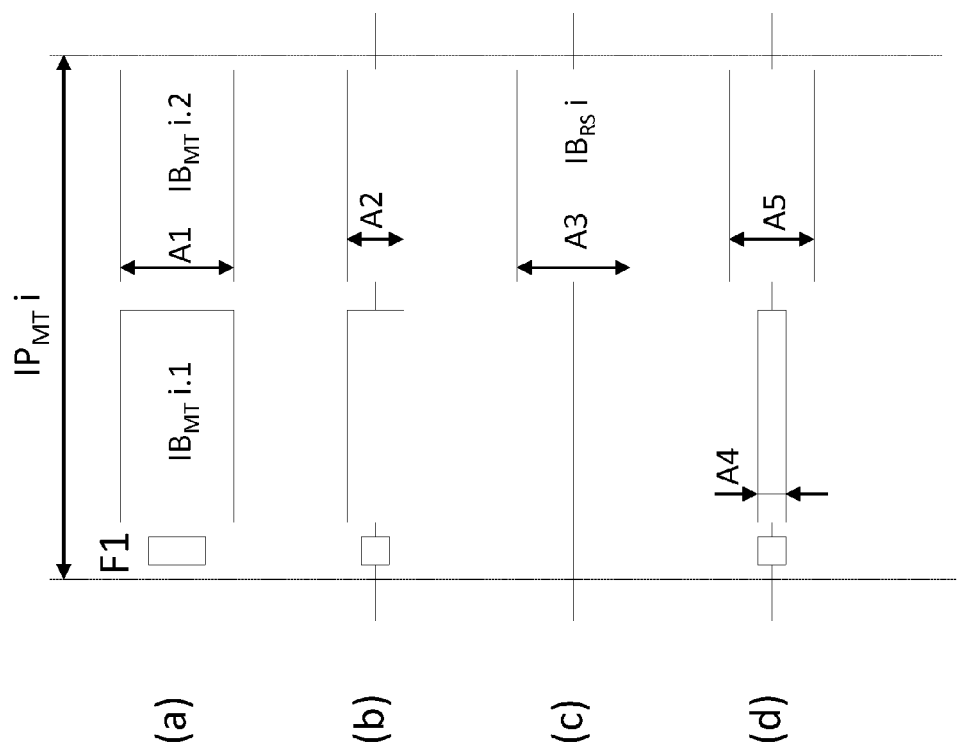

FIG. 5 schematically shows the overlapping of the signals from the main transmitter 100 and from the receiver apparatus 106. FIG. 5*a* shows a first information packet $IP_{MT}i$ of the first broadcast transmission signal as it is transmitted by the main transmitter 100. The signal has a certain amplitude range, indicated by A1 in FIG. 5*a*. The output received at the position of the receiver apparatus 106 (illustration 1) is still A2 (FIG. 5*b*). It can be clearly seen that A2 is smaller than A1. The receiver apparatus generates a second information packet $IP_{RS}i$ of the second transmission signal, which is indicated in FIG. 5*c*. The respective first information blocks $IB_{MT}i.1$ in the first information packets of the first broadcast transmission signal which are received from the receiver are amplified and are transmitted as the information blocks $IB_{RS}i$, chronologically synchronously with the second information blocks $IB_{MT}i.2$, as a second transmission signal. The amplitude range of the information blocks $IB_{RS}i$ is A3, as indicated in FIG. 5*c*. It can clearly be seen that A3 is larger than A2. A3 could be e.g., amplified in the receiver apparatus 106 so that A1 could be almost be achieved.

We will now consider a receiver at the position P in FIG. 1. It will be assumed that no reception is possible at the position P, either because the position is outside the reception area 104 or is inside, at a point with unfavourable reception (hidden node). The receiver sees an overlapped signal as shown in FIG. 5*d*. During the transmission of the first information block, the receiver in the position P sees an attenuated first broadcast transmission signal with an amplitude range A4. This can be seen in FIG. 5*d* (left-hand side), wherein A4, in turn, is smaller than A2. The second information block, with an amplitude range A5, is formed by the constructive overlapping of the information blocks $IB_{MT}i.2$ and $IB_{RS}i$.

Let it be assumed that the amplitude range A2 is still sufficiently large enough to guarantee a good reception but that the amplitude range A4, however, is too small for this. Hence, without the overlap with the second transmission signal, it would not be possible to receive and to retransmit the first broadcast transmission signal correctly at the position P. By means of the overlapping with the second transmission signal, the receiver in the position P receives the second information blocks with a boosted amplitude A5, which is large enough to guarantee a good reception. The coverage area of the first broadcast transmission signal has thus been increased.

Figure 6:
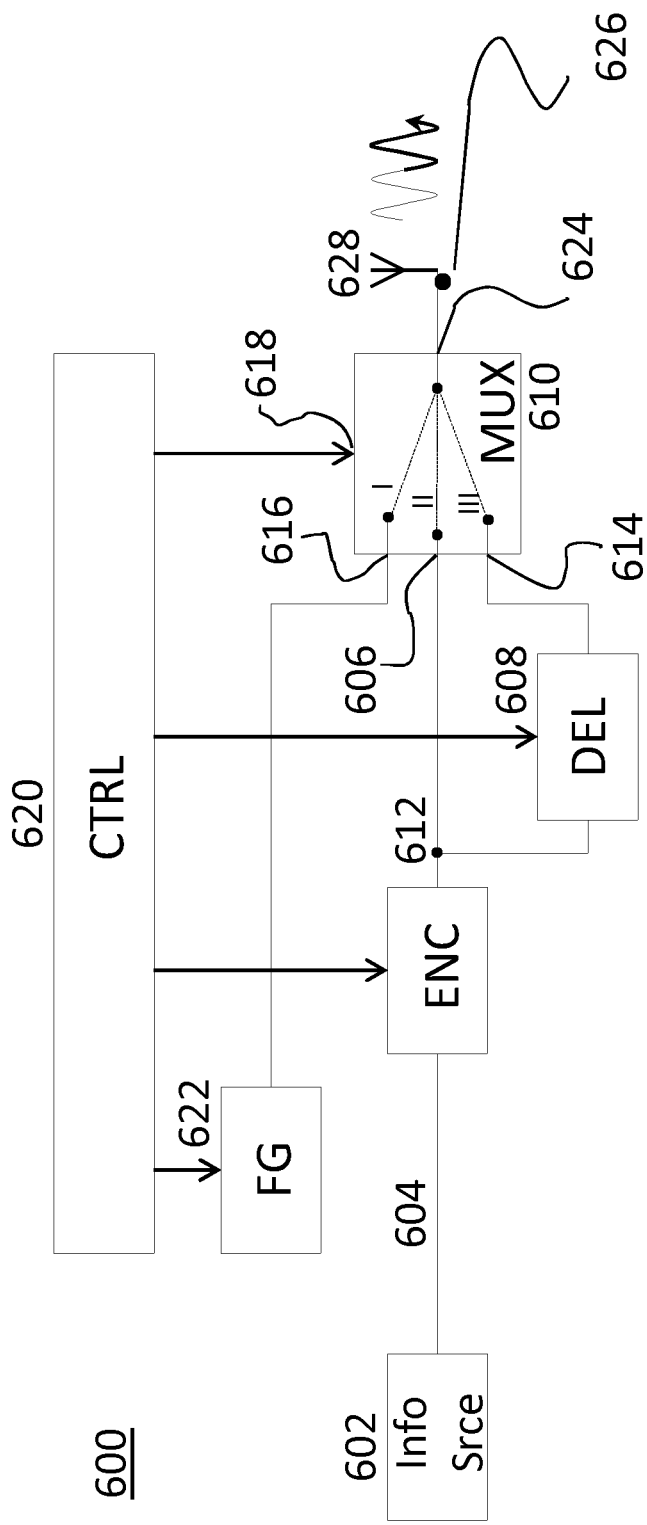
FIG. 6 shows an embodiment of a main transmitter in accordance with the invention, FIG. 7 schematically shows the generation of the first broadcast transmission signal in the main transmitter.

FIG. 6 depicts an embodiment of a main transmitter in the transmission arrangement in accordance with the invention. An information signal source 602 is shown in FIG. 6. This source provides the information signal which is to be transmitted from the main transmitter. This source does not need to be part of the main transmitter because the arrangements according to the invention are not located in the source 602. An output for the source 602 is coupled to an input terminal 604 of the main transmitter. The input terminal 604 is coupled to an input of a coding unit 606. An output of the coding unit 606 is coupled to the inputs of a delay unit 608 and a multiplexer unit 610. An output of the delay unit 608 is coupled to an input 614 of the multiplexer unit 610. A 'flag signal' generating unit 622 is provided with an output coupled to a third input 616 of the multiplexer unit 610. An output 624 of the multiplexer unit 610 is coupled to an output terminal 626 of the main transmitter 600. A control unit 620 is also provided, which controls the various units of the main transmitter 600. The output terminal 618 of the main transmitter 600 is coupled to a transmitting antenna 628. It is also the case here that the transmitting antenna 628 does not need to be a part of the main transmitter according to the invention because the arrangements according to the intervention are not located in the transmitting antenna.

Figure 7:
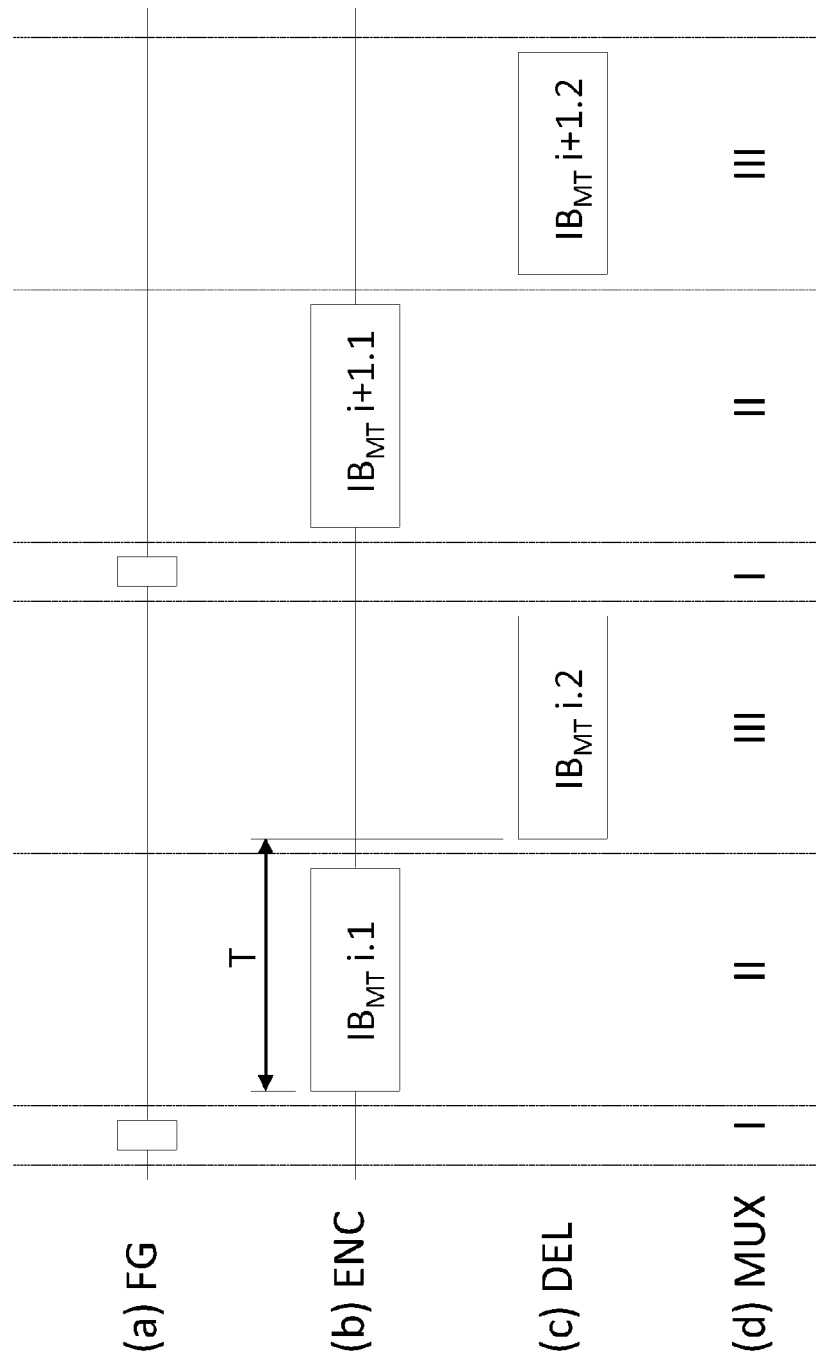

The method of working of the main transmitter in FIG. 6 will be further explained with reference to FIG. 7. FIG. 7*a* shows the output signal generated by the 'flag signal' generating unit 622, as a function of time, as a response to a control signal from the control unit 620 (CTRL). FIG. 7*b* shows the output signal of the coding unit 606 as a function of time, in response to a control signal from the control unit 620. FIG. 7*c* shows the output signal of the delay unit 608 as a function of time, in response to a control signal from the control unit 620. As can be seen in FIGS. 7*b* and 7*c*, an information block $IB_{MT}i.1$ in the delay unit 608 is delayed by an interval T and is emitted at its output as information block $IB_{MT}i.2$.

FIG. 7*d* shows the operating principle of the multiplexer unit 610, if this is depicted as a simple toggle switch. FIG. 7*d* shows the position of this switch, as a function of time. The system is controlled by the control unit 620. Initially, the switch 610 is in position I, so that the flag is located at the output terminal 626. Subsequently, the switch 610 is in position II and the first information block $IB_{MT}i.1$ of an information packet is transmitted. The switch 610 is then in position III and the second information block $IB_{MT}i.2$ is transmitted. The steps are repeated, so that there is a continual data stream at the output.

Figure 8:
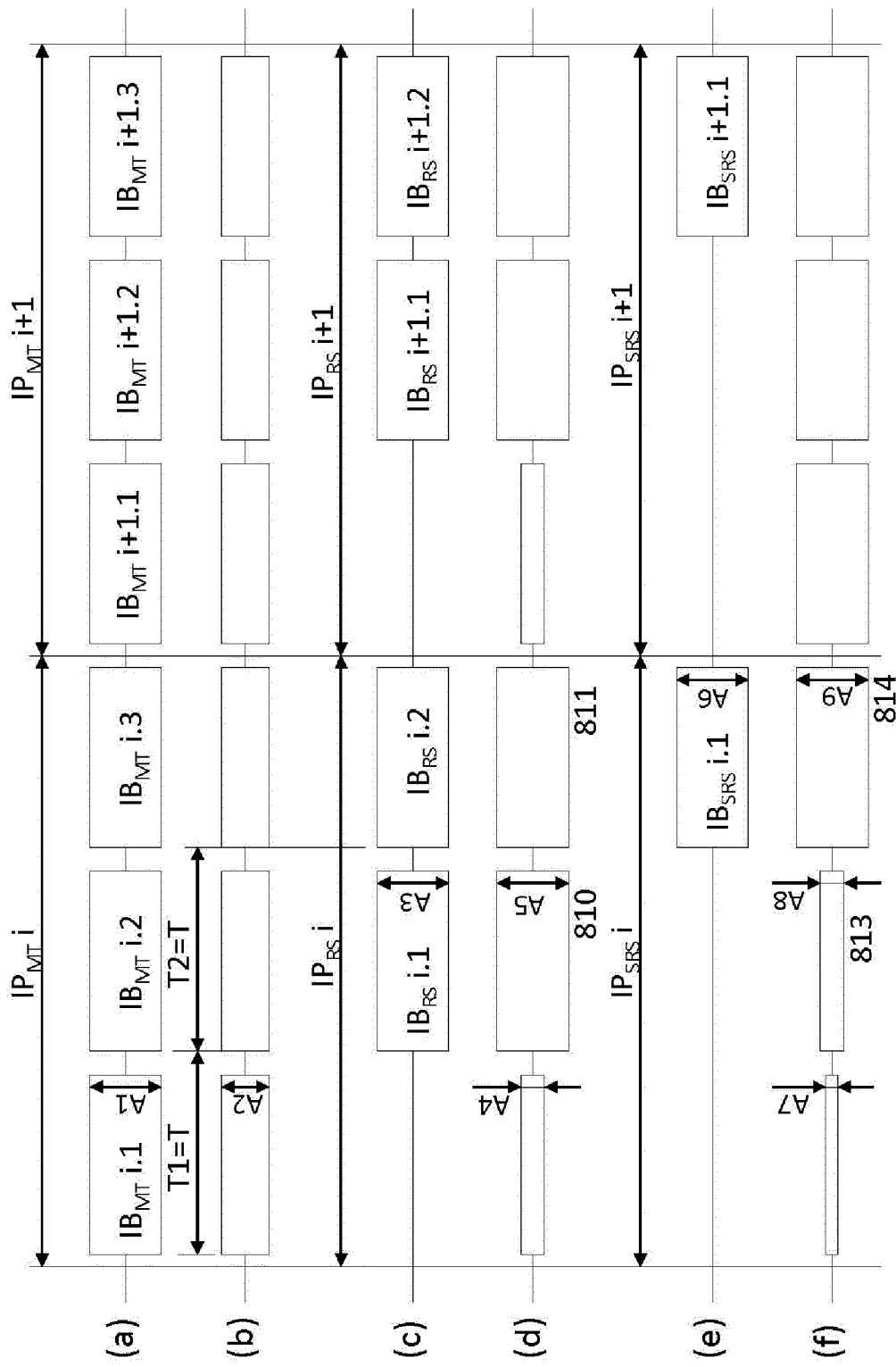
FIG. 8 shows an embodiment wherein the first information packets of the first broadcast transmission signal contain three information blocks, and the second information packets of the second broadcast transmission signal contain two information blocks.

FIG. 8 depicts another embodiment of the first and second transmission signals. In this embodiment, the first information packets . . . , $IP_{MT}i$, $IP_{MT}i+1$, of the first information signal, as indicated in FIG. 8*a*, each contain three information blocks $IB_{MT}i.1$, $IB_{MT}i.2$, $IB_{MT}i.3$, with the same information contents. The second information packets . . . , $IP_{RS}i$, $IP_{RS}i+1$, . . . of the second transmission signal, as indicated in FIG. 8*c*, each contain two information blocks $IB_{RS}i.1$, $IB_{RS}i.2$ with the same information contents, and with the same information contents as the information blocks $IB_{MT}i.1$, $IB_{MT}i.2$, $IB_{MT}i.3$. It is the case that the pairs of information blocks $IB_{MT}i.2$ and $IB_{RS}i.1$ or $IB_{MT}i.3$ and $IB_{RS}i.2$ are generally chronologically synchronous.

Figure 9:
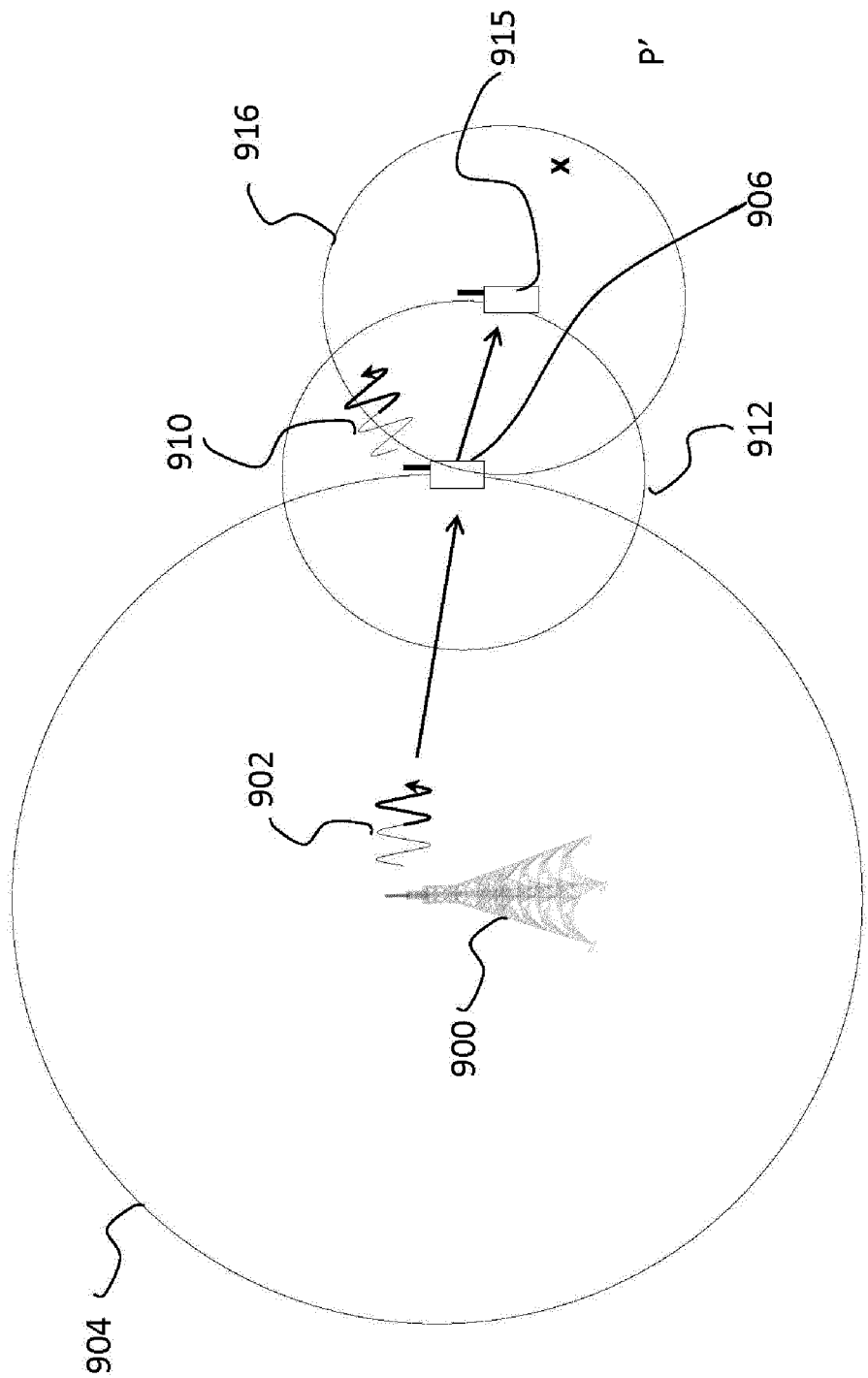
FIG. 9 shows a second embodiment of the transmission arrangement, and FIG. 10 schematically shows the generation of another first transmission signal, in a second embodiment of the main transmitter.

FIG. 9 shows how the first broadcast transmission signal in FIG. 8*a* is transmitted from a main transmitter 900 with an amplitude range A1. The first broadcast transmission signal is indicated in FIG. 9 by the reference number 902. A receiver apparatus 906, which is still located within the reception area 904 of the main transmitter 900, receives the first broadcast transmission signal 902, but with an attenuated amplitude range A2, as shown in FIG. 8*b*. The receiver apparatus 906 generates the second broadcast transmission signal 910 in FIG. 8*c*, with an amplitude range A3. On the other hand, A3 may be the same as A1, for example.

FIG. 8*d* now schematically shows the overlapping of the signals from the main transmitter 900 and from the receiver apparatus 906. We will now consider a second receiver apparatus 915 at the position P in FIG. 9. It will be assumed that no reception of the first broadcast transmission signal is possible at the position P because the position P is located outside the coverage area 904 of the main transmitter 900. The second receiver apparatus 915 sees an overlapped signal as shown in FIG. 8*d*. During the transmission of the first information block, the receiver apparatus 915 sees an attenuated first broadcast transmission signal with an amplitude range A4. This can be seen in FIG. 8*d* (on the far left), wherein A4, in turn, is smaller than A2. The second and third information blocks 810 and 811, with an amplitude range A5, are formed by the constructive overlap of the information blocks $IB_{MT}i.2$ (in an attenuated form) and $IB_{RS}i.1$ or $IB_{MT}i.3$ (in an attenuated form) and $IB_{RS}i.2$.

Since the second receiver apparatus 915 is located outside the reception area of the main transmitter 900, the amplitude range A4 is too small to guarantee a good reception. Hence, without the overlap with the second transmission signal, it would not be possible to receive and to retransmit the first broadcast transmission signal correctly at the position P. By means of the overlapping with the second transmission signal, the second receiver apparatus 915 in the position P receives the second and third information blocks 810 and 811 with a boosted amplitude A5, which is large enough to guarantee a good reception.

Hence, the second receiver apparatus 915 is capable of receiving the blocks 810 and 811 correctly and, in response to this, of generating a third transmission signal, as shown in FIG. 8e, using the information packets . . . , $IP_{SRS}i$, $IP_{SRS}i+1$, . . . . It is the case that the information packets $IP_{RS}i$ and $IP_{SRS}i$ are of the same length in time. It is the case that the information blocks $IB_{MT}i.2$ and $IB_{RS}i.1$ or $IB_{RS}i.2$ and $IB_{SRS}i$ are generally chronologically synchronous and have the same information contents.

The second receiver apparatus 915 is capable of detecting the two information blocks, such as 810 and 811, in a received information packet, as information blocks with the same information contents, e.g., because the information blocks . . . , $IB_{MT}i.2$, $IB_{MT}i+1.2$, . . . in FIG. 8a are provided with a flag F2 (not shown) by the main transmitter 900 and the receiver apparatus is capable of detecting this flag F2.

FIG. 8f now schematically shows the overlapping of the signals from the main transmitter 900 and from the first and from the second receiver apparatus 906 and 915, at a position P' within the reception area 916 of the second receiver apparatus in FIG. 9. A receiver at the position P' sees an overlapped signal as shown in FIG. 8f. During the transmission of the first information block, the receiver sees a still further attenuated first broadcast transmission signal with an amplitude range A7. This can be seen in FIG. 8f (on the far left), wherein A7, in turn, is smaller than A4. The second information block 813, with an amplitude range A8, is formed by the constructive overlap of the information blocks $IB_{MT}i.2$ (in a still further attenuated form) and $IB_{RS}i.1$ (in an attenuated form). The third information block 814, with an amplitude range A9, is formed by the constructive overlap of the information blocks $IB_{MT}i.3$ (in a still further attenuated form), $IB_{RS}i.2$ (in a further attenuated form) and $IB_{SRS}i$ (in an attenuated form).

Let it now been assumed that the amplitude range A9 is still large enough to guarantee a good reception, but that the amplitude ranges A7 and A8 are too small for this. Hence, without the overlap with the second transmission signal, it would not be possible still to receive the first broadcast transmission signal correctly and to re-transmit the first broadcast transmission signal correctly at the position P'. By means of the overlapping, the receiver in the position P' receives the information block 814 with a boosted amplitude A9, which is large enough to guarantee a good reception. The coverage area of the first broadcast transmission signal is thus increased in turn.

Figure 10:
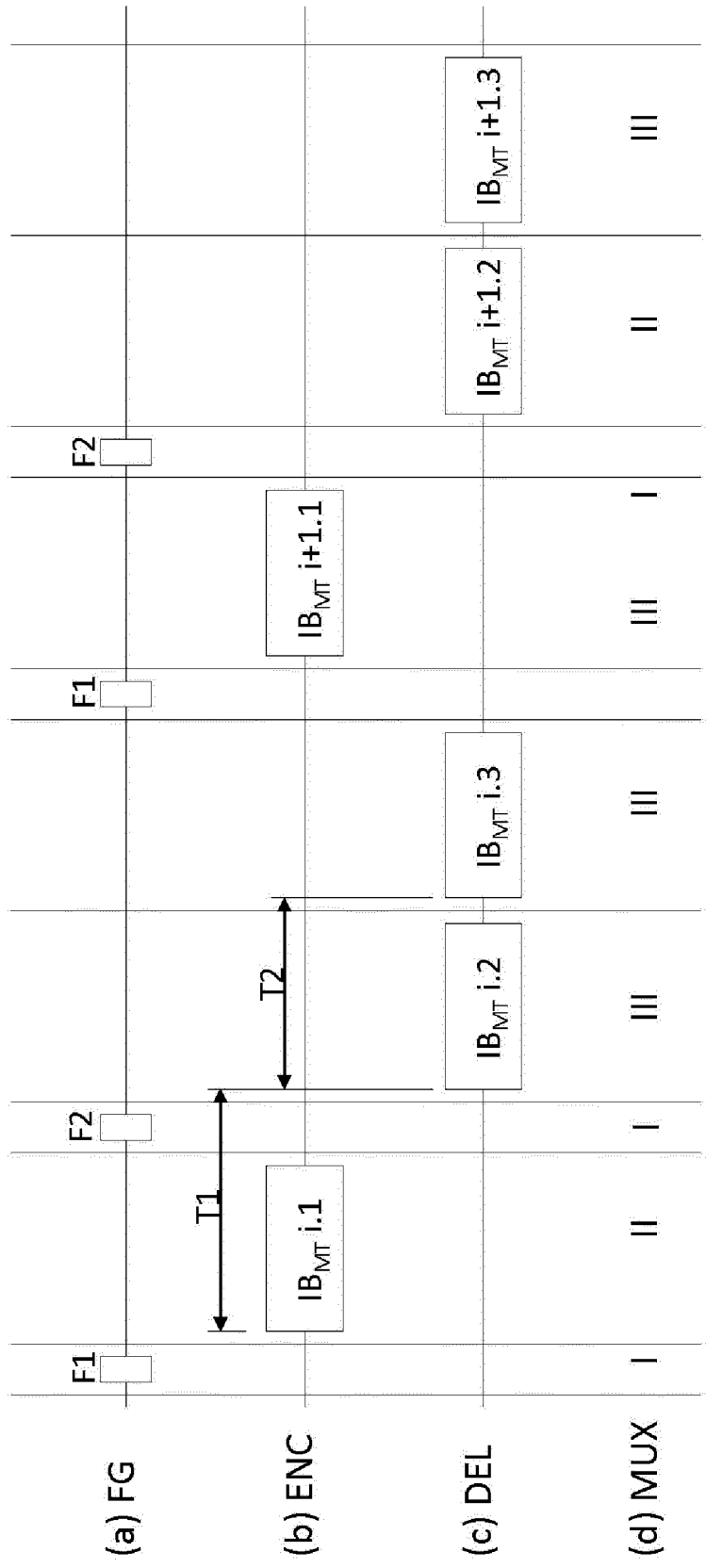

How the main transmitter 900 directs the first broadcast transmission signal will now be described in accordance with FIG. 8a. This will be further explained with reference to FIGS. 6 and 10. In this embodiment, it is also assumed that flags are also included in the first transmission signal: a flag F1 to identify the first information block $IB_{MT}i.1$ in a first information packet $IP_{MT}i$ and a flag F2 to identify the second information block $IB_{MT}i.2$ in a first information packet $IP_{MT}i$.

FIG. 10a shows the output signal generated by the 'flag signal' generating unit 622, as a function of time, as a response to a control signal from the control unit 620 (CTRL). FIG. 10b shows the output signal of the coding unit 606 as a function of time, in response to a control signal from the control unit 620. FIG. 10c shows the output signal of the delay unit 608 as a function of time, in response to a control signal from the control unit 620. As can be seen in FIGS. 10b and 10c, an information block $IB_{MT}i.1$ is delayed once by an interval T1, and once by an interval T2 in the delay unit 608 and is emitted at its output as information blocks $IB_{MT}i.2$ and $IB_{MT}i.3$. In this case, the intervals T1 and T2 are not the same as each other because another flag F2 should be inserted between the first information block $IB_{MT}i.1$ and the second information block $IB_{MT}i.2$. In an embodiment wherein a flag F2 is not included, of course, the intervals T1 and T2 are equal.

FIG. 10d shows the operating principle of the multiplexer unit 610, if this is depicted as a simple toggle switch. FIG. 10d shows the position of this switch, as a function of time. The system is controlled by the control unit 620. Initially, the switch 610 is in position I. A flag F1 is generated in the 'flag signal' generating unit 622 and is provided at the terminal 616 of the multiplexer unit 610, and is thus emitted at the output terminal 626. Subsequently, the switch 610 is in position II. The first information block $IB_{MT}i.1$ of an information packet is transmitted and is also saved in the delay unit 608. After this, the switch 610 is again in position I. A flag F2 is generated in the 'flag signal' generating unit 622 (see FIG. 10a) and is provided at the terminal 616 of the multiplexer unit 610, and is thus emitted at the output terminal 626. After this, the switch of the multiplexer unit 610 is in position III and the information block $IB_{MT}i.1$, delayed for the first time over T1, is emitted by the delay unit 608 as information block $IB_{MT}i.2$ at the terminal 614 of the multiplexer unit 610 and is then transmitted. The multiplexer unit 610 remains in position III, so that the information block $IB_{MT}i.1$, delayed for the second time, now, in addition, over T2, is emitted and transmitted by the delay unit 608 as information block $IB_{MT}i.3$. The steps are repeated, so that there is a continual data stream at the output.

As already noted above, the flags are not necessarily required to identify an information block in a receiver apparatus. It is also possible to determine whether consecutive information blocks have the same information contents by comparing the information contents of consecutive information blocks. In addition, it may be noted that, if flags are in place, such as the flags F1 and F2 as described above with reference to FIG. 10a, these flags F1 and F2 should not necessarily be different.

How the receiver apparatus 906 and 915 in FIG. 9 work, so that they are capable of receiving the broadcast transmission signals correctly, as shown in FIGS. 8b, 8d and 8f, and, if necessary, of further processing these will now be described. The outlined switching of a receiver apparatus, as shown in FIG. 4, is used for a more detailed explanation.

The delay unit 428 in the embodiment of the receiver apparatus 906 and 915 is constructed differently, with the effect that it is capable of delaying the control signal from the detection unit 416 twice, each time separated by the interval T, if no flags are present, or by an interval T1 and then additionally by an interval T2, if flags are present in the received signal. Likewise, the detection unit 416 is constructed differently, so that it is capable of detecting whether three information blocks with the same contents are present in an information packet (the situation in FIG. 8b), whether two information blocks with the same contents are present in an information packet (the situation in FIG. 8d), or whether only one information block is present in an information packet (the situation in FIG. 8f). As already indicated above, these three situations can be detected on the basis of the detection of the flags, or, if there are no flags present, by comparing the contents of the information blocks.

If the receiver apparatus determines that a broadcast transmission signal, such as in FIG. 8b, is received, the first information block of an information packet is saved in the transmission memory 418. Following this, a control signal, delayed once by interval T (or T1), is fed to the transmission memory 418, so that an information block delayed by once this interval T (or T1) is provided by the delay unit 418 (after amplifying the signal, if necessary) at the transmitting antenna 430. After this, a control signal, once more delayed by the interval T (or by an additional interval T2) is fed to the transmission memory 418, so that an information block delayed by twice this interval T (or by an interval T1+T2) is provided by the delay unit 418 (after amplifying the signal, if necessary) at the transmitting antenna 430. This results in the transmission signal as shown in FIG. 8c (where T1=T2).

If the receiver apparatus determines that a transmission signal, such as in FIG. 8d, is received, the first information block of the received information packet (that is, the information block 810, because the information block represented in FIG. 8d with an amplitude A4 is too small to be received correctly) is saved in the transmission memory 418. Following this, a control signal, delayed by once the interval T (or T2) is fed to the transmission memory 418, so that an information block delayed by once this interval T (or T2) is provided by the delay unit 418 (after amplifying the signal, if necessary) at the transmitting antenna 430. This results in the transmission signal as shown in FIG. 8e.

If the receiver apparatus determines that a transmission signal, such as in FIG. 8f, is received, the first information block of the received information packet (that is, the information block 814, because the information blocks represented in FIG. 8f with an amplitude A7 and A8 are too small to be correctly received) is only decoded in the decoder unit 412.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

The elements and characteristics described in the various forms of preferred embodiments can be mutually combined without departing from the scope of the invention.

Further implementation details will not be described, as the man skilled in the art is able to carry out the invention starting from the teaching of the above description.

The invention claimed is:

1. A transmission arrangement adapted for transmitting a first broadcast transmission signal, the transmission arrangement comprising:
 a main transmitter for transmitting the first broadcast transmission signal in a reception area,
 wherein the main transmitter is adapted to transmit a first broadcast transmission signal in the form of subsequent first information packets ($IP_{MT}1$, $IP_{MT}2$, $IP_{MT}3$, . . . ), subsequent first information packets ($IP_{MT}i$) comprising at least two subsequent information blocks ($IB_{MT}i.1$, $IB_{MT}i.2$) comprising substantially the same information;
 at least one receiver apparatus, the at least one receiver apparatus adapted to receive the first broadcast transmission signal and to transmit a second broadcast transmission signal in response to the reception of the first broadcast transmission signal,
 wherein the second broadcast transmission signal is in the form of subsequent second information packets ($IP_{RS}1$, $IP_{RS}2$, $IP_{RS}3$, . . . ), subsequent second information packets ($IP_{RS}i$) comprising at least one information block ($IB_{RS}i$),
 the second information packets ($IP_{RS}i$) of the second broadcast transmission signal are of substantially the same length in time as the first information packets ($IP_{MT}i$) of the first broadcast transmission signal,
 the information blocks ($IB_{RS}i$) of the second information packets are of substantially the same length in time and of substantially the same information as the information blocks ($IB_{MT}i.j$) of the first information packets,
 and the receiver apparatus is adapted to transmit the second broadcast transmission signal in time, such that the second information blocks ($IB_{MT}i.2$, $IB_{MT}i+1.2$, . . . ) in the first information packets in the first broadcast transmission signal are synchronous with the at least first information blocks ($IB_{RS}i$, $IB_{RS}i+1$, . . . ) in the second broadcast information packets in the second broadcast transmission signal.

2. The transmission arrangement as claimed in claim 1, wherein the receiver apparatus is adapted to transmit the second broadcast transmission signal in a second reception area, in time and with a phase such that the second information blocks ($IB_{MT}i.2$, $IB_{MT}i+1.2$, . . . ) of the first information packets in the first broadcast transmission signal and the at least first information blocks ($IB_{RS}i$, $IB_{RS}i+1$) of the second information packets in the second broadcast transmission signal that are synchronous with said second information blocks of the first information packets, add up in the second reception area.

3. The transmission arrangement as claimed in claim 1, wherein the first information packets ($IP_{MT}i$) in the first broadcast transmission signal comprise two information blocks ($IB_{MT}i.1$, $IB_{MT}i.2$) of substantial equal information content, and the second information packets ($IP_{RS}i$) in the second broadcast transmission signal comprise one information block ($IB_{RS}i$).

4. The transmission arrangement as claimed in claim 1, wherein the first information packets in the first broadcast transmission signal comprise three information blocks ($IB_{MT}i.1$, $IB_{MT}i.2$, $IB_{MT}i.3$) of substantially equal information content, and the second information packets in the second broadcast transmission signal comprise two information blocks ($IB_{RS}i.1$, $IB_{RS}i.2$) of substantially equal information content.

5. The transmission arrangement as claimed in claim 1, wherein the main transmitter and the at least one receiver apparatus are adapted to act as transmitters in a Single-Frequency Network (SFN).

6. The transmission arrangement as claimed in claim 1, wherein a flag is allocated to the first information block ($IB_{MT}i.1$) in a first information packet ($IP_{MT}i$), indicating that this information block is the first information block in the first information packet.

7. The transmission arrangement as claimed in claim 4, wherein a flag is allocated to the second information block ($IB_{MT}i.2$) in a first information packet ($IP_{MT}i$), indicating that this information block is the second information block in the first information packet.

8. A receiver apparatus adapted to be used in a transmission arrangement as claimed in claim 1, wherein the receiver apparatus is provide with
   a. an input terminal for receiving the first transmission signal,
   b. a detection unit for detecting the first information block ($IB_{MT}i.1$) in an information packet ($IP_{MT}i$) in the first transmission signal, and for generating a control signal in response thereto,
   c. a transmission memory for storing the first information block of an information packet in response to the control signal,
   d. a delay unit for delaying the control signal over a certain time interval,
   e. an output terminal for supplying the information block ($IB_{MT}i.1$) stored in the transmission memory as an information block ($IB_{RS}i$) in the second transmission signal, and
   the transmission memory is adapted to supply an information block stored in the memory to the output terminal in response to the delayed control signal.

9. The receiver apparatus as claimed in claim 8, wherein the receiver apparatus is adapted to transmit the information blocks ($IB_{RS}i$) of the second broadcast transmission signal, substantially time synchronous to the second information blocks ($IB_{MT}i.2$) of the first information packets ($IP_{MT}i$) in the first transmission signal, at the location of the receiver apparatus.

10. The receiver apparatus as claimed in claim 8, wherein the detection unit is adapted to detect flags allocated to the first information blocks in the first information packets of the first broadcast transmission signal and to generate the control signal in response thereto.

11. The receiver apparatus as claimed in claim 8, wherein the delay unit is further adapted to delay the control signal once over a first time interval and additionally over a second time interval), and the transmission memory is adapted to supply an information block stored in the memory twice to the output terminal in response to the control signal delayed over the first time interval and in response to the additionally over the second time interval delayed control signal.

12. The receiver apparatus as claimed in claim 11, wherein the first time interval equals the second time interval.

13. A main transmitter adapted for transmitting a first broadcast transmission signal in a reception area, said first broadcast transmission signal in the form of subsequent first information packets (IPMT1, IPMT2, IPMT3, . . . ), subsequent first information packets (IPMTi) comprising at least two subsequent information blocks (IBMTi.1, IBMTi.2) comprising substantially the same information, wherein
   said main transmitter adapted to receive a second broadcast transmission signal in response to the transmission of the first broadcast transmission signal,
   the second broadcast transmission signal being in the form of subsequent second information packets (IPRS1, IPRS2, IPRS3, . . . ), subsequent second information packets (IPRSi) comprising at least one information block (IBRSi),
   the second information packets (IPRSi) of the second broadcast transmission signal being of substantially the same length in time as the first information packets (IPMTi) of the first broadcast transmission signal,
   the information blocks (IBRSi) of the second information packets being of substantially the same length in time and of substantially the same information as the information blocks (IBMT i,j) of the first information packets, and
   the second broadcast transmission signal being such that the second information blocks (IBMTi.2, IBMT i+1.2, . . . ) in the first information packets in the first broadcast transmission signal are synchronous with the at least first information blocks (IBRS i, IBRS i+1, . . . ) in the second information packets in the second broadcast transmission signal.

14. A main transmitter as claimed in claim 13, wherein the main transmitter is provided with
   a. an input terminal for receiving an information signal,
   b. a coding unit for coding the information signal into subsequent information blocks ($IB_{MT}$ i.1, $IB_{MT}i+1.1$, . . . ),
   c. a delay unit for delaying the information blocks over a certain time interval,
   d. a multiplexer unit for multiplexing the information blocks ($IB_{MT}$ i.1, $IB_{MT}i+1.1$, . . . ) and the delayed information blocks ($IB_{MT}$ i.2, $IB_{MT}i+1.2$, . . . ) into a serial datastream, and
   e. an output terminal for supplying the serial datastream as the first transmission signal.

15. The main transmitter as claimed in claim 14, wherein the delay unit is adapted to delay an information block ($IB_{MT}$ i.1) once over this time interval (T), and the multiplexer unit is adapted to multiplex the information block ($IB_{MT}$ i.1) and its delayed version ($IB_{MT}$ i.2) directly after each other in the serial data stream.

16. The main transmitter as claimed in claim 14, wherein the delay unit is adapted to delay an information block ($IB_{MT}$ i.1) once over a first time interval and additionally over a second time interval, and the multiplexer unit is adapted to multiplex the information block ($IB_{MT}$ i.1) over the first time interval delayed version ($IB_{MT}$ i.2) and its over the second time interval delayed version ($IB_{MT}i.3$) after each other in the serial data stream.

17. The main transmitter as claimed in claim 15, wherein it further comprises a flag generation unit and the multiplexer unit is adapted to allocate a flag to the information blocks ($IB_{MT}$ i.1, $IB_{MT}i+1.1$, . . . ) of the coding unit and to include them in the serial data stream.

18. The main transmitter as claimed in claim 16, wherein it further comprises a flag generation unit and the multiplexer unit is adapted to allocate a flag to the over the first time interval delayed information blocks ($IB_{MT}$ i.2, $IB_{MT}i+1.2$, . . . ) of the coding unit and to include them in the serial data stream.

19. The main transmitter as claimed in claim 16 wherein the first time interval equals the second time interval.

20. A receiver apparatus adapted to receive a first broadcast transmission signal (102), the first broadcast transmission signal being in the form of subsequent first information packets (IPMT1, IPMT2, IPMT3, . . . ), subsequent first information packets (IPMTi) comprising at least two subsequent information blocks (IBMTi.1, IBMTi.2) comprising substantially the same information, wherein
   the receiver apparatus is adapted to transmit a second broadcast transmission signal in response to the reception of the first broadcast transmission signal,
   the second broadcast transmission signal being in the form of subsequent second information packets (IPRS1, IPRS2, IPRS3, . . . ), subsequent second information packets (IPRSi) comprising at least one information block (IBRSi), the second information packets (IPRSi) of the second broadcast transmission signal being of substantially the same length in time as the first information packets (IPMTi) of the first broadcast transmission signal, the information blocks (IBRSi) of the second information packets being of substantially the same length in time and of substantially the same information as the information blocks (IBMT i,j) of the first information packets, and the receiver apparatus is adapted to transmit the second broadcast transmission signal such that the second information blocks (IBMTi.2, IBMT i+1.2, . . . ) in the first information packets in the first broadcast transmission signal are synchronous with the at least first information blocks (IBRS i, IBRS i+1, . . . ) in the second information packets in the second broadcast transmission signal.

21. The receiver apparatus as claimed in claim 20, wherein the receiver apparatus is a mobile receiver apparatus.

22. The receiver apparatus as claimed in claim 20, wherein the receiver apparatus is provided with a transmitter antenna.

\* \* \* \* \*